United States Patent Office 2,847,368
Patented Aug. 12, 1958

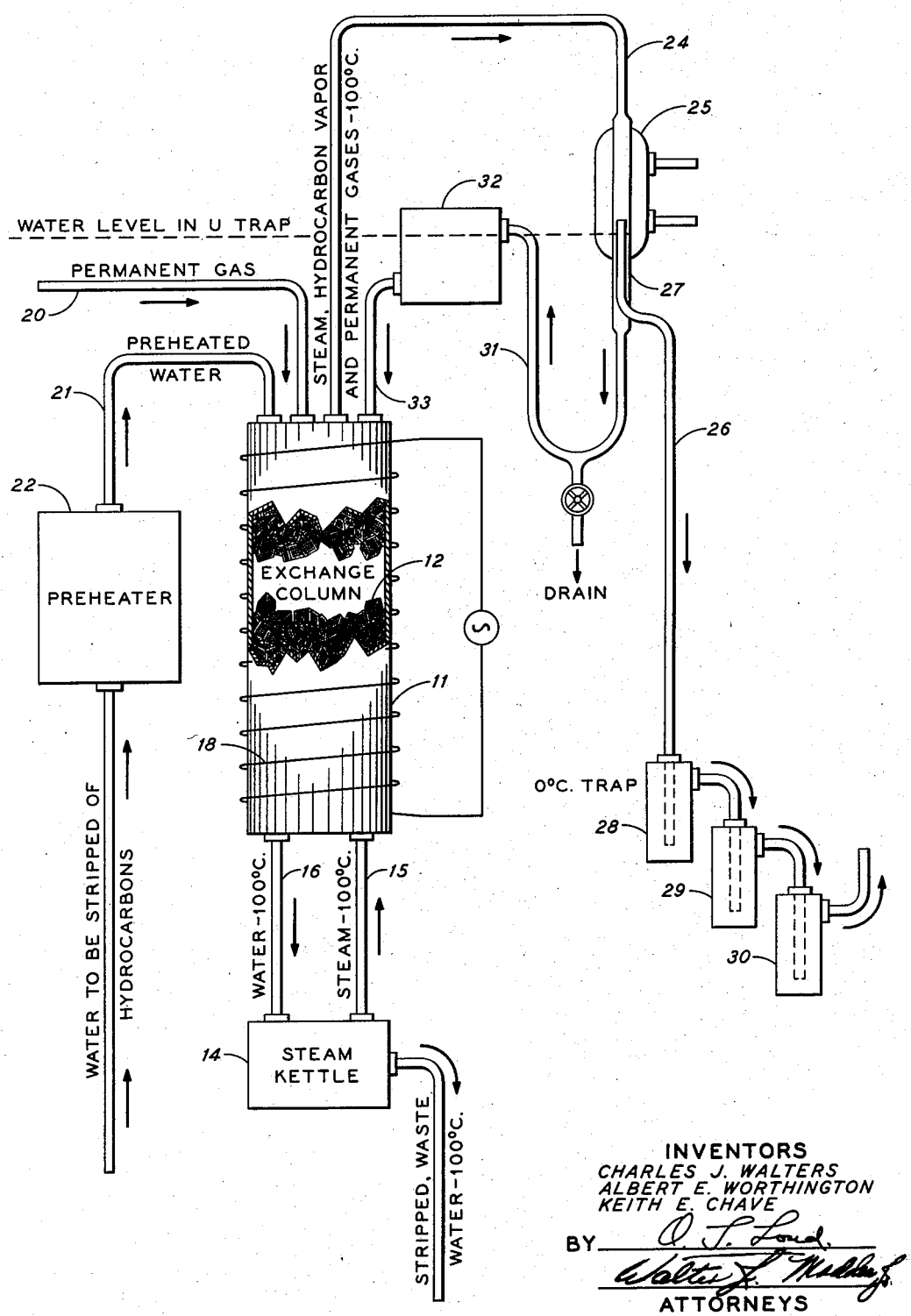

2,847,368

EXTRACTION OF HYDROCARBONS FROM WATER

Albert E. Worthington, Laguna Beach, Charles J. Walters, La Habra, and Keith E. Chave, La Mirada, Calif., assignors to California Research Corporation, San Francisco, Calif., a corporation of Delaware Application September 24, 1956, Serial No. 611,606

7 Claims. (Cl. 202—46)

This invention relates in general to extraction techniques and relates more particularly to methods and apparatus for extracting trace amounts of hydrocarbons from water.

There are numerous applications where it is desirable to extract or remove trace amounts of hydrocarbons from water and then concentrate the removed hydrocarbons so that they can be made available for some sort of quantitative analysis. One of such applications, and the one to which the present invention is particularly directed, is the removal of trace amounts of hydrocarbons from water samples obtained in geochemical prospecting operations. In such prospecting, water samples are collected over the surveyed area, and the hydrocarbons, if present, are removed therefrom and their concentrations determined to obtain an indication of the relative abundance of the hydrocarbons in the waters in the surveyed area.

The removal of the hydrocarbons from the water poses a very difficult problem, particularly since the concentrations are commonly less than one ppm. and often less than a part per billion. In dealing with concentrations of this order, conventional extraction or separation techniques, such as solvent extraction or steam distillation, do not attain a sufficient enhancement of the concentration in a single cycle. For example, the use of simple steam distillation requires distillation of 5 to 10 percent of the sample in order to remove a significant fraction of the volatile materials. This amounts to an increase in concentration of 20 to 10 fold, which is not sufficient to bring the more dilute samples into the range of possible analysis.

Broadly, the present invention contemplates an extraction method and apparatus for removing trace amounts of hydrocarbons from water in which the water is contacted by steam in a countercurrent flow apparatus to produce a stripping of the hydrocarbon fractions from the water. The incoming water and the steam preferably contact each other in an exchange column having a large surface area over which the stripping takes place. Preferably, both the steam and the water are at substantially the same temperature, which is the temperature at which water boils, i. e., 100° C. The hydrocarbons of interest, namely, those more soluble in water, are all more volatile than water at this temperature, so that the selected hydrocarbons pass from the water phase to the steam phase during the passage of the water through the exchange column. A single passage through the column thus corresponds to many cycles of steam distillation and produces therefore a correspondingly enhanced enrichment of the materials of interest.

The stripped hydrocarbons and steam pass out of the top of the exchange column, preferably under the action of a flow of permanent gas, such as air, to suitable condensers and traps where the vapors are condensed and the hydrocarbons therein are trapped by a suitable solvent. After the water sample has passed through the exchange column, the concentrated hydrocarbons and solvent may then be withdrawn from the apparatus and the desired analysis operations performed to determine the concentrations of the different hydrocarbons.

Objects and advantages of the present invention will be readily apparent from the following description when read in connection with the accompanying drawing, the single figure of which schematically illustrates a representative embodiment of the present invention.

Referring to the drawing by character of reference, reference numeral 11 designates an exchange column in which the countercurrent contacting between the steam and water occurs. Exchange column 11 is filled with a suitable packing material 12 presenting a large surface area, so that the water to be stripped spreads out over this packing as it flows down the exchange column, to provide maximum contact with the upflowing steam. Such packing may be of any suitable type, and we have found that a particularly effective form of packing is in the form of cubes of stainless steel wire screen, sold under the trade name of OCTA-PAK. An alternate form of packing which is very suitable for the present invention is in the form of coils of wire of stainless steel, sold under the trade name HELI-PAK. The exchange column is filled with these cubes or coils of wire which are specially designed for the effective contacting of vapor and liquid through capillary distribution.

Steam is supplied to the bottom of exchange column 11 from a suitable source such as a kettle 14 connected to exchange column 11 through a conduit 15. Kettle 14 also has a conduit 16 leading thereto from exchange column 11, so that a portion of the stripped water leaving exchange column 11 may be vaporized in kettle 14 to provide the stripping steam. Exchange column 11 is preferably provided with a heater 18 disposed around the periphery thereof for supplying heat to the column to reduce the wall heat losses to nearly zero, and to assist in heating the incoming water to the desired temperature. The water to be stripped enters column 11 through a conduit 21 from a preheater 22, where the water to be stripped has been preheated to a suitable temperature.

A conduit 24 is provided at the top of exchange column 11 for withdrawing therefrom the hydrocarbons and other substances accumulating in the top of the column. This withdrawal is aided by a flow of a suitable gas, such as air, which is injected into the top of column 11 through a conduit 20 and which then flow in the top of column 11 and through outlet conduit 24. Conduit 24 leads to a condenser 25, where the vapors are cooled to room temperature. The liquid condensate from condenser 25 leaves the condenser through a conduit 27 and the remaining vapors leave condenser 25 through a conduit 26. As shown in the drawing, conduit 26 extends up through conduit 27 into condenser 25, so that the opening in the top of conduit 26 extends above the liquid level in the condenser. Conduit 26 leads to a first cold trap 28, at ice temperature, 0° C., which removes most of the water vapor from the mixture. The remaining mixture leaving trap 28 enters second and third cold traps 29 and 30, containing iso-octane, to remove essentially all of even the lowest boiling hydrocarbons of interest in the mixture.

Conduit 27 leads from condenser 25 through a U-trap 31 to a constant level device 32 which maintains a substantially constant liquid level in U-trap 31. Constant level device 32 is connected through a conduit 33 back to column 11.

The operation of the embodiment illustrated in the drawing is as follows: The water to be stripped is supplied to preheater 22 in any suitable fashion. For example, if the water is in a jar or bottle, the contents thereof may be pumped through preheater 22. The preheated water then flows through conduit 21 to the input connection at the top of exchange column 11 and flows downwardly through the column over the surface of the packing material 12. Simultaneously with this downward flow of the water to be stripped, steam from the kettle at the bottom of the column passes up the column, some of the steam being condensed by heat losses from the exposed section of the column walls, some being condensed by heating the incoming water to 100° C. from its preheated temperature, and some steam being condensed in reheating the room temperature, condensate returning to the top of the column from condenser 25. Finally, some of the steam passes out of the top of the column and condenses in condenser 25. Heater 18 surrounding exchange column 11 preferably supplies sufficient heat to reduce the column wall losses to nearly zero, and also assists in heating the two incoming water streams from preheater 22 and condenser 25 to 100° C. By suitable design and adjustment of the heating and flow units, the amount of water passing as steam into the condenser 25 and being recycled into the column is kept to a small fraction of the total water in the column.

Since the column is filled with a packing material, all liquid water, including the original sample water, the returned water from condenser 25, and the internal reflux within the column, spreads out over this packing as it flows down the column, thus presenting a large surface area to the upflowing steam. This countercurrent flow provides repeated opportunities for equilibrium between the steam and the liquid water. In terms of distillation theory, this amounts to a number of theoretical equilibrium stages between the vapor and the liquid flowing countercurrently through the column. This action results in the more volatile components rising in the column and the less volatile components flowing down the column.

In other words, the water flowing down the column is successively stripped of more volatile components so that by the time the water reaches the bottom of exchange column 11, none of the more volatile components occur in either the water or the steam phase. According to simple vapor pressure theory, only those hydrocarbon components boiling below the boiling point of water (100° C.) will concentrate in the top of the column. However, because of the dissimilarity between water molecules and hydrocarbon molecules, hydrocarbons which boil appreciably above 100° C. are more volatile than water in a solution of hydrocarbons and water, and thus can be concentrated by the steam stripper of the present invention.

Permanent gases which are dissolved in the water to be stripped will have such large vapor pressures at 100° C. that their partition between the liquid and vapor phases will be so greatly in favor of the latter phase that substantially all of these permanent gases will pass into the vapor phase essentially immediately upon contact therewith and will remain there.

The mixture of steam, hydrocarbon vapor and permanent gases passes out of the top of the exchange column 11, under the action of the flow of air through conduit 20, through conduit 24 to condenser 25, where the mixture is cooled to room temperature. From condenser 25 the permanent gases pass directly through conduit 26 to cold traps 28, 29 and 30, carrying with them an amount of water and hydrocarbon vapor proportional to both the vapor pressure of the mixture of these materials at room temperature and the volume of permanent gas. The hydrocarbons of interest accumulate primarily in the iso-octane in trap 29, although under rare circumstances some reaches trap 30. The vapor condenses to liquid water in condenser 25, flows through U-tube 31 to constant level device 32, and thence back into column 11 through conduit 33.

At the conclusion of the run, the stripped hydrocarbons occur in iso-octane solution in traps 29 and 30. This solution is removed from the traps and analyzed in some suitable manner, such as in a mass spectrometer or by infrared analysis, to determine the concentration of the hydrocarbons of interest.

In summary, the success of the steam stripping operation of the present invention in concentrating trace amounts of hydrocarbons originally dissolved in water into a conveniently small volume of solvent can be attributed to the following factors: The hydrocarbons of interest, namely, those most soluble in water, are all more volatile than water at 100° C. Additionally, the stripping operation removes essentially all hydrocarbons more volatile than water at 100° C. from the large volume of the original sample by equilibrating this large volume with a relatively small volume of steam and air from which the hydrocarbons can be effectively extracted with a small volume of solvent.

The sensitivities obtainable with the apparatus of the present invention in conjunction with suitable analysis methods make the equipment extremely valuable in extracting trace amounts of hydrocarbons from water. For example, the steam stripper itself is capable of producing an enhancement of concentration by a factor of better than $10^4$. This degree of concentration, combined with a sensitivity to one part in $10^6$ available with infrared analysis, produces an overall effective concentration factor of better than $10^{10}$. Thus, under these conditions, the analysis technique may be utilized to detect concentrations of hydrocarbons of less than tenths of a part per billion.

Although but one embodiment of the present invention has been illustrated and described, it will be apparent to those skilled in the art that various changes and modifications may be made therein without departing from the spirit of the invention or the scope of the appended claims.

We claim:

1. The method of extracting trace amounts of hydrocarbons from water comprising the steps of introducing said water into an exchange column, introducing steam into said column to provide a countercurrent contact between said steam and said water, the continued contact of said steam with said water in said column producing a number of theoretical equilibrium stages between said steam and said water to remove said hydrocarbons from said water and to cause said removed hydrocarbons to move to the top of said column, withdrawing said removed hydrocarbons from said column, and condensing said withdrawn hydrocarbons.

2. The method of extracting trace amounts of hydrocarbons from water comprising the steps of introducing said water into an exchange column, introducing steam into said column to provide a countercurrent contact between said steam and said water, the continued contact of said steam with said water in said column producing a number of theoretical equilibrium stages between said steam and said water to remove said hydrocarbons from said water and to cause said removed hydrocarbons to move to the top of said column, injecting a permanent gas into said top of said column to withdraw said removed hydrocarbons from said column, and condensing said withdrawn hydrocarbons.

3. The method in accordance with claim 2, wherein said permanent gas is air.

4. The method of extracting trace amounts of hydrocarbons from water comprising the steps of introducing said water into an exchange column, introducing steam into said column to provide a countercurrent contact between said steam and said water, the continued contact of said steam with said water in said column producing a number of theoretical equilibrium stages between said steam and said water to remove said hydrocarbons from said water and to cause said removed hydrocarbons to move to the top of said column, injecting a permanent gas into said top of said column to withdraw said removed hydrocarbons from said column, condensing said withdrawn hydrocarbons, and passing said condensed hydrocarbons through a solvent to trap said hydrocarbons in said solvent.

5. The method of claim 4 wherein said solvent is isooctane.

6. The method of extracting trace amounts of hydrocarbons from water comprising the steps of passing said water downwardly through an exchange column having a packing providing a large surface area on which said water spreads out, passing steam upwardly through said column to contact said water spread out on said packing material, the continued contact of said steam with said water in said column producing a number of theoretical equilibrium stages between said steam and said water to remove said hydrocarbons from said water and to cause said removed hydrocarbons to move to the top of said column, and withdrawing said removed hydrocarbons from said column.

7. The method of extracting trace amounts of hydrocarbons from water comprising the steps of passing said water downwardly through an exchange column having a packing providing a large surface area on which said water spreads out, passing steam upwardly through said column to contact said water spread out on said packing material, the continued contact of said steam with said water in said column producing a number of theoretical equilibrium stages between said steam and said water to remove said hydrocarbons from said water and to cause said removed hydrocarbons to move to the top of said column, withdrawing said removed hydrocarbons from said column, and condensing said withdrawn hydrocarbons.

References Cited in the file of this patent
UNITED STATES PATENTS 2,556,030     Coulter et al.             June 5, 1951